US012597576B2

(12) United States Patent
Tsukada et al.

(10) Patent No.: US 12,597,576 B2
(45) Date of Patent: Apr. 7, 2026

(54) ELECTROMAGNETIC RELAY

(71) Applicant: OMRON Corporation, Kyoto (JP)

(72) Inventors: Takashi Tsukada, Kyoto (JP); Takeshi Nishida, Kyoto (JP); Kazuki Furukawa, Kyoto (JP); Naoki Kawaguchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 248 days.

(21) Appl. No.: 17/690,007

(22) Filed: Mar. 9, 2022

(65) Prior Publication Data

US 2022/0293378 A1 Sep. 15, 2022

(30) Foreign Application Priority Data

Mar. 15, 2021 (JP) ................................ 2021-041697

(51) Int. Cl.
*H01H 50/38* (2006.01)
*H01H 50/14* (2006.01)
*H01H 50/36* (2006.01)
*H01H 50/54* (2006.01)

(52) U.S. Cl.
CPC ............ *H01H 50/36* (2013.01); *H01H 50/14* (2013.01); *H01H 50/38* (2013.01); *H01H 50/54* (2013.01)

(58) Field of Classification Search
CPC ...................................................... H01H 50/38
USPC .......................................................... 335/201
See application file for complete search history.

(56) References Cited

U.S. PATENT DOCUMENTS 3,082,307 A * 3/1963 Greenwood ......... H01H 33/664 218/123
5,109,146 A * 4/1992 Maenishi ............... H01H 9/443 335/201
5,394,128 A * 2/1995 Perreira ................. H01H 51/06 335/154
5,519,370 A * 5/1996 Perreira ................. H01H 9/443 218/123
5,546,061 A 8/1996 Okabayashi et al.
6,448,877 B1 9/2002 Harayama et al.
6,911,884 B2 6/2005 Uotome et al.

(Continued)

FOREIGN PATENT DOCUMENTS

CN 202013854 U 10/2011
CN 110223868 A 9/2019

(Continued)

OTHER PUBLICATIONS

The Office Action for the corresponding Korean application No. 10-2022-0017470, issued on Mar. 19, 2024.

(Continued)

*Primary Examiner* — Alexander Talpalatski
(74) *Attorney, Agent, or Firm* — SHINJYU GLOBAL IP

(57) ABSTRACT

An electromagnetic relay includes a first fixed terminal, a base, and a magnet. The first fixed terminal includes a first fixed contact. The base holds the first fixed terminal. The base includes a magnet insertion hole disposed in a vicinity of the first fixed contact. The magnet insertion hole has an opening opened toward the first fixed terminal. The magnet is disposed in the magnet insertion hole and is prevented from coming off from the magnet insertion hole by the first fixing terminal.

10 Claims, 7 Drawing Sheets

(56) References Cited

U.S. PATENT DOCUMENTS

| | | | | |
|---|---|---|---|---|
| 8,519,808 | B2 * | 8/2013 | Morimura | H01H 50/08 335/78 |
| 8,653,917 | B2 * | 2/2014 | Takaya | H01H 9/443 335/131 |
| 10,170,260 | B2 * | 1/2019 | Hayashida | H01H 50/54 |
| 2015/0262777 | A1 | 9/2015 | Tsurusu et al. | |
| 2016/0300673 | A1 | 10/2016 | Yamagata et al. | |
| 2017/0309429 | A1 | 10/2017 | Hayashida et al. | |
| 2019/0157030 | A1 | 5/2019 | Sunohara et al. | |

FOREIGN PATENT DOCUMENTS

| | | | |
|---|---|---|---|
| JP | S48-40921 | Y | 11/1973 |
| JP | H3-291824 | A | 12/1991 |
| JP | 2002-329447 | A | 11/2002 |
| JP | 2012-104360 | A | 5/2012 |
| JP | 2019-96460 | A | 6/2019 |

OTHER PUBLICATIONS

The Office Action for the corresponding Chinese application No. 202210144712.5 issued on Jun. 28, 2025.

Zhu Jipu, Li Chaolin and LIU Lihong, Mechanical and electrical components, published by Beijing Institute of Technology Press; p. No. 70, submitted with statement of relevance.

The Office Action for the corresponding Chinese application No. 202210144712.5 issued on Apr. 18, 2025.

Gao Zhenxing and Chen Dawei, Electrical Instrumentation and Communication System for Civil Aviation Aircraft, published by China Civil Aviation Press; pp. Nos. 83 to 89, submitted with statement of relevance.

The Office Action for the corresponding Japanese application No. 2021-041697 issued on Aug. 20, 2024.

The Office Action for the corresponding Chinese application No. 202210144712.5 issued on Dec. 16, 2024.

* cited by examiner

ELECTROMAGNETIC RELAY

This application claims priority to Japanese Patent Application No. 2021-041697, filed Mar. 15, 2021. The contents of that application are incorporated by reference herein in their entirety.

FIELD

The present invention relates to an electromagnetic relay.

BACKGROUND

The electromagnetic relay disclosed in Japanese Unexamined Patent Application Publication 2012-104360 includes a magnet for blocking an arc generated at a contact. The arc is extended in the arc extinguishing space in the contact case by the Lorentz force due to the magnetic force of the magnet. The magnet is located on the outside of the contact case made of an insulating material to prevent the arc from continuing through the magnets during interruption and to protect against the arc.

SUMMARY

In the electromagnetic relay in Japanese Unexamined Patent Application Publication No. 2012-104360, in order to increase the magnetic flux density in the vicinity of the contact, it is necessary to use a magnet having a strong magnetic force, which may increase the manufacturing cost of the electromagnetic relay. Further, when the magnet is disposed near the contact, the manufacturing cost of the electromagnetic relay may increase even when a member for protecting the magnet from the arc is separately provided or when a member for holding the magnet is separately provided. For example, in the electromagnetic relay disclosed in Chinese Utility Model No. 202013854, a sealing material is applied to hold the magnet on the outside of the base, which increases the manufacturing cost.

An object of the present invention is to suppress an increase in manufacturing cost in an electromagnetic relay.

The electromagnetic relay according to one aspect of the present invention includes a first fixed terminal, a base, and a magnet. The first fixed terminal includes a first fixed contact. The base holds the first fixed terminal. The base includes a magnet insertion hole disposed in a vicinity of the first fixed contact. The magnet insertion hole has an opening opened toward the first fixed terminal. The magnet is disposed in the magnet insertion hole and is prevented from coming off from the magnet insertion hole by the first fixing terminal.

In this electromagnetic relay, the magnet is prevented from coming off from the magnet insertion hole by the first fixed terminal. That is, since the first fixed terminal is disposed so as to cover at least a part of the magnet insertion hole, it is possible to suppress the magnet from being affected by an arc by the first fixed terminal. As a result, it is possible to suppress an increase in the manufacturing cost of the electromagnetic relay as compared with the case where a member for protecting the magnet from the arc or a member for holding the magnet are separately provided. Further, since the magnet can be disposed in the vicinity of the first fixed contact, the magnetic flux density can be efficiently increased in the vicinity of the first fixed contact. As a result, it becomes possible to select a magnet having a low magnetic force, so that it is possible to further suppress an increase in the manufacturing cost of the electromagnetic relay.

The first fixed terminal may cover a whole of the opening of the magnet insertion hole. In this case, the magnet can be further suppressed from being affected by the arc.

The magnet may be disposed apart from the first fixed terminal. In this case, it is possible to suppress the first fixed terminal from interfering with the magnet, so that, for example, a variation in the height of the first fixed contact can be avoided.

The first fixed terminal may further include a contact support portion configured to support the first fixed contact, and a first extending portion extending at an angle from the contact support portion and protruding outward from the base. In this case, for example, when the arc is stretched in the direction from the contact support portion toward the first extension portion, the first extension portion can also serve as an arc horn for stretching the arc.

The first fixed terminal may further include a second extending portion that is connected to the contact support portion and faces the first extending portion. The magnet insertion hole may be disposed between the first extending portion and the second extending portion. In this case, for example, in an electromagnetic relay in which the extension direction of the arc changes depending on the polarity, the first extending portion and the second extending portion can also serve as an arc horn for stretching the arc. Further, the magnet can be prevented from coming off from the magnet insertion hole by any of the first extending portion, the second extending portion, and the contact support portion.

The first fixed terminal may further include a contact support portion that supports the first fixed contact. The magnet insertion hole may be opened toward the contact support portion. In this case, the magnetic flux density can be efficiently increased in the vicinity of the first fixed contact.

The first fixed contact may include a caulked portion fixed by being caulked to the first fixed terminal. The caulked portion may be disposed in the magnet insertion hole. In this case, interference of the caulked portion with the base due to the magnet insertion hole can be avoided. That is, the magnet insertion hole can be used as a space for releasing the caulked portion.

The electromagnetic relay may further include a second fixed terminal and a movable contact piece. The second fixed terminal may include a second fixed contact and may be disposed apart from the first fixed terminal. The movable contact piece may include a first movable contact facing the first fixed contact and a second movable contact facing the second fixed contact. In this case, in the electromagnetic relay including the first fixed terminal and the second fixed terminal, it is possible to suppress an increase in the manufacturing cost of the electromagnetic relay.

DETAILED DESCRIPTION

Hereinbelow, an embodiment of an electromagnetic relay according to one aspect of the present invention will be described with reference to the drawings. Note that in each drawing, the X1 direction will be described as the left direction, the X2 direction as the right direction, the Y1 direction as the front direction, the Y2 direction as the rear direction, the Z2 direction as the upward direction, and the Z1 direction as the downward direction. It should be noted that these directions are defined for convenience of explanation, and do not limit the arrangement direction of the electromagnetic relay.

Figure 1:
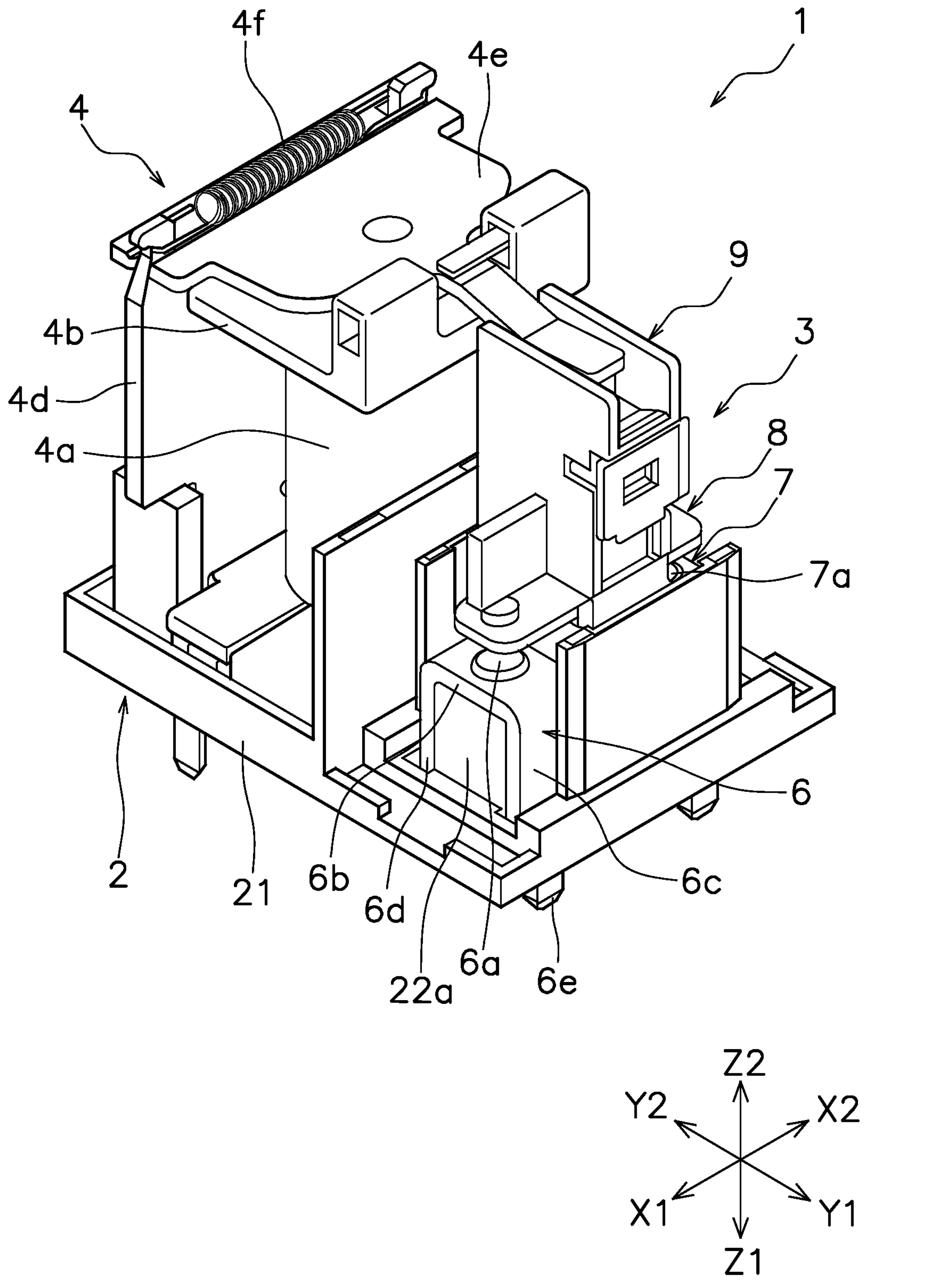
FIG. 1 is a perspective view of an electromagnetic relay.
Figure 2:
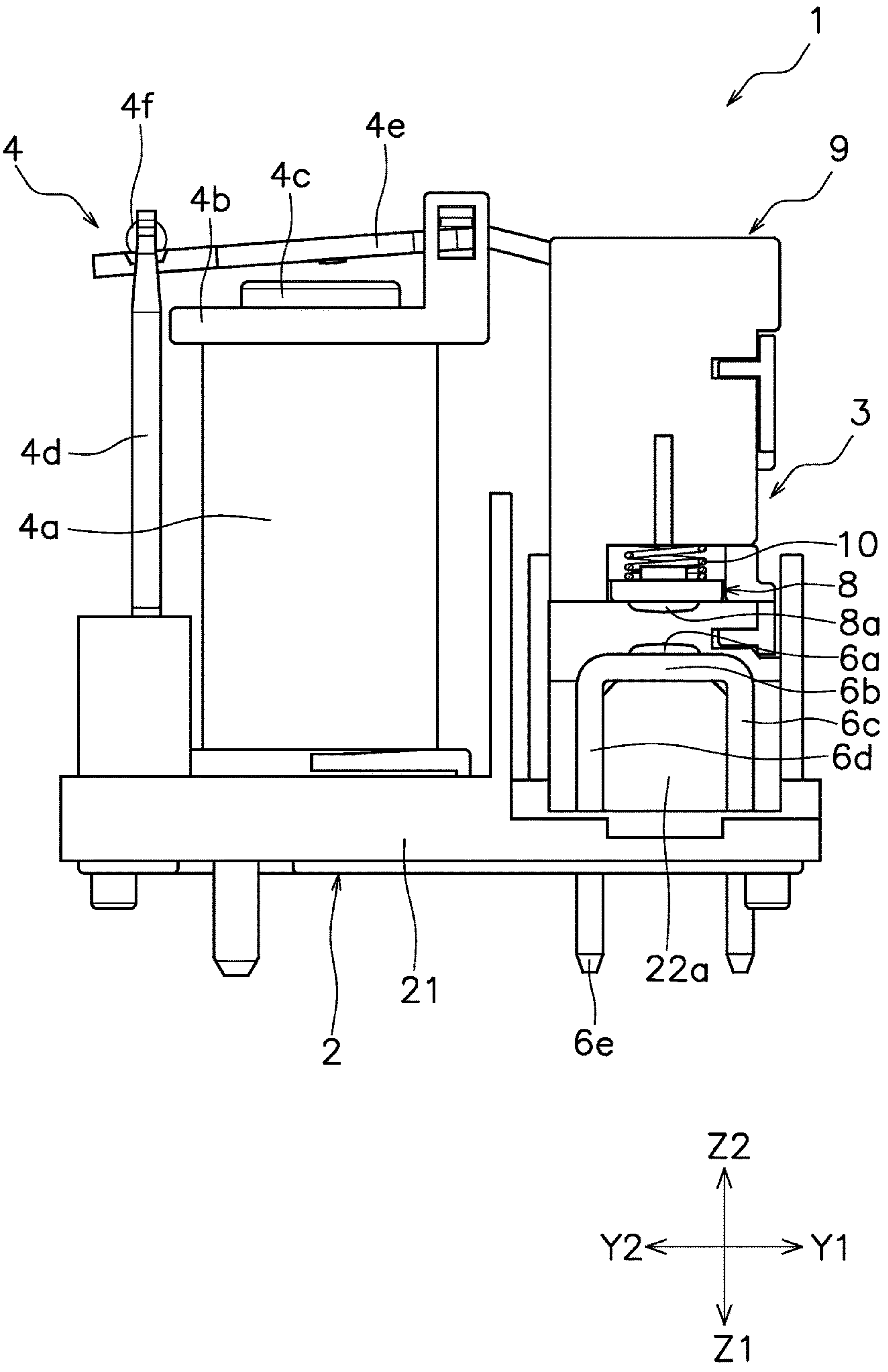
FIG. 2 is a side view of the electromagnetic relay.

As illustrated in FIGS. 1 and 2, the electromagnetic relay 1 includes a base 2, a contact device 3, and a drive device 4. The base 2 is made of an insulating material such as resin. The base 2 supports the contact device 3 and the drive device 4. The contact device 3 and the drive device 4 are covered by a case (not shown) attached to the base 2.

Figure 3:
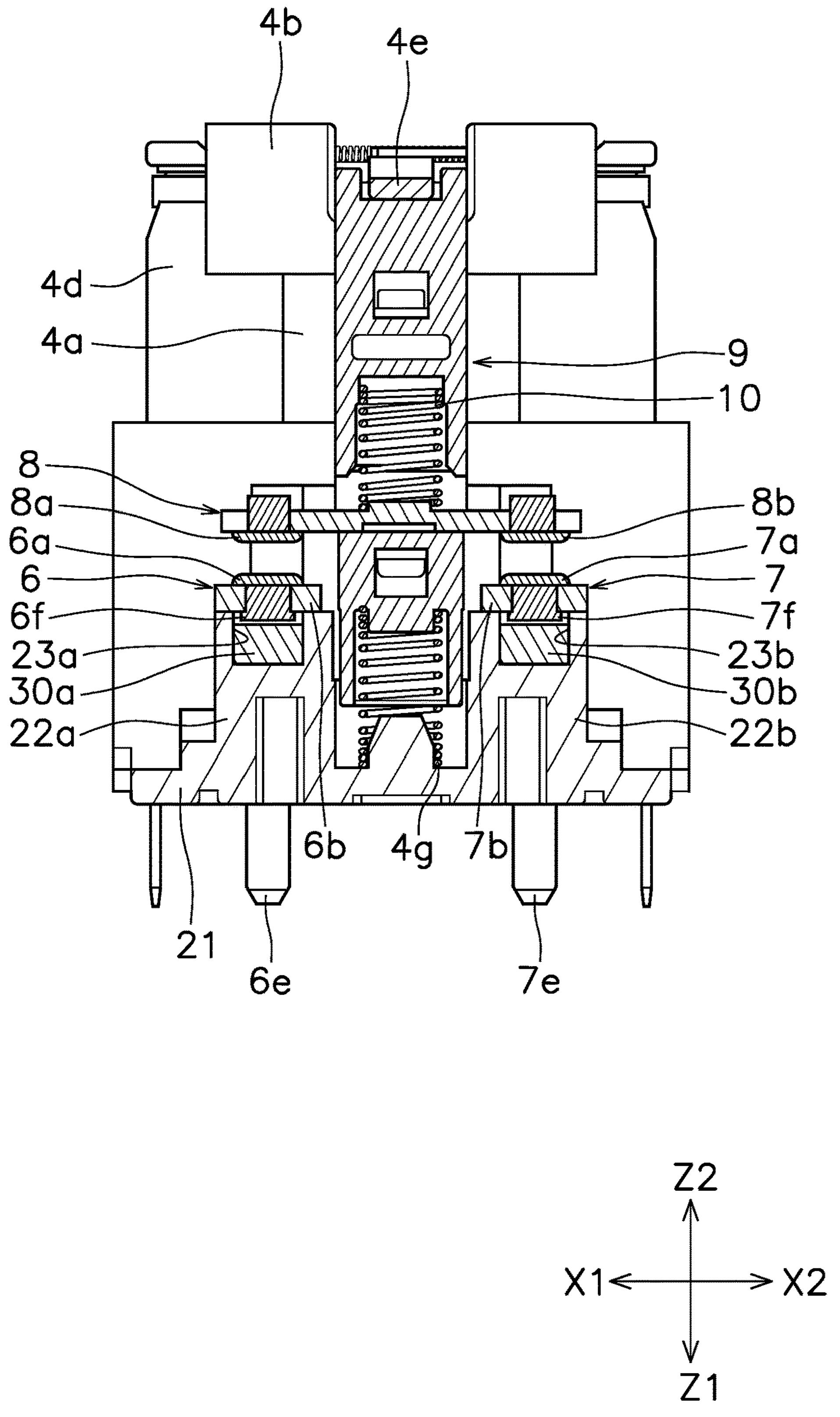
FIG. 3 is a cross-sectional view of the electromagnetic relay cut along a plane orthogonal to the front-rear direction.

FIG. 3 is a cross-sectional view of the contact device 3 cut along a plane orthogonal to the front-rear direction. The base 2 includes a bottom portion 21, terminal support portions 22*a* and 22*b*, and a magnet insertion holes 23*a*, 23*b*. The bottom portion 21 has a rectangular shape when viewed from the up-down direction.

The terminal support portions 22*a* and 22*b* are formed so as to protrude upward from the bottom portion 21. The terminal support portion 22*a* is disposed apart from the terminal support portion 22*b* in the left-right direction. The upper surfaces of the terminal support portions 22*a* and 22*b* include flat surfaces orthogonal to each other in the up-down direction.

The magnet insertion hole 23*a* is provided in the terminal support portion 22*a*. The magnet insertion hole 23*a* opens upward. The magnet insertion hole 23*a* is formed so as to be recessed downward on the upper surface of the terminal support portion 22*a*. The magnet insertion hole 23*a* is covered with the terminal support portion 22*a* in the left-right direction, the front-back direction, and below. The magnet insertion hole 23*b* is provided in the terminal support portion 22*b*. The magnet insertion hole 23*b* opens upward. The magnet insertion hole 23*b* is formed so as to be recessed downward on the upper surface of the terminal support portion 22*b*.

The contact device 3 includes a first fixed terminal 6, a second fixed terminal 7, a movable contact piece 8, a movable member 9, and a contact spring 10. The first fixed terminal 6, the second fixed terminal 7, and the movable contact piece 8 are plate-shaped terminals and are made of a conductive material such as copper.

The first fixed terminal 6 and the second fixed terminal 7 have a U-shaped cross section, and when viewed from the left-right direction have a shape bent in a U-shape. The first fixed terminal 6 and the second fixed terminal 7 are held by the base 2. The first fixed terminal 6 and the second fixed terminal 7 are fixed by being press-fitted into the base 2, for example.

The first fixed terminal 6 includes a first fixed contact 6*a*, a contact support portion 6*b*, a first extending portion 6*c*, a second extending portion 6*d*, a pair of external connection portions 6*e*. The first fixed contact 6*a* is disposed on the contact support portion 6*b*. The first fixed contact 6*a* includes a caulked portion 6*f* that is fixed by being caulked to the first fixed terminal 6. The caulked portion 6*f* protrudes downward from the contact support portion 6*b*. The caulked portion 6*f* is disposed in the magnet insertion hole 23*a*.

The contact support portion 6*b* is supported by the upper surface of the terminal support portion 22*a*. The contact support portion 6*b* extends in a direction orthogonal to the up-down direction. The contact support portion 6*b* supports the first fixed contact 6*a*. The first fixed contact 6*a* is fixed by being caulked to the contact support portion 6*b*. The first fixed contact 6*a* may be integrated with the first fixed terminal 6, and caulked portion 6*f* may be omitted.

The first extending portion 6*c* and the second extending portion 6*d* are fixed by being press-fitted into the bottom portion 21 of the base 2. The first extending portion 6*c* is connected to the contact support portion 6*b* and protrudes outward from the base 2. The first extending portion 6*c* bends downward from the front end of the contact support portion 6*b* and protrudes downward from the bottom portion 21 of the base 2. The first extending portion 6*c* is in contact with the front surface of the terminal support portion 22*a*. The second extending portion 6*d* faces the first extending portion 6*c* in the front-rear direction. The second extending portion 6*d* is connected to the contact support portion 6*b* and protrudes outward from the base 2. The second extending portion 6*d* bends downward from the rear end of the contact support portion 6*b* and protrudes downward from the bottom portion 21 of the base 2. The second extending portion 6*d* is in contact with the rear surface of the terminal support portion 22*a*. The pair of external connection portions 6*e* are disposed at the lower end of the first extending portion 6*c* and the lower end of the second extending portion 6*d*, and are electrically connected to an external device (not shown).

The second fixed terminal 7 is disposed apart from the first fixed terminal 6 in the left-right direction. The second fixed terminal 7 has the same shape as the first fixed terminal 6. The second fixed terminal 7 includes a second fixed contact 7*a*, a contact support portion 7*b*, a first extending portion 7*c*, a second extending portion 7*d*, a pair of external connecting portions 7*e*, and a caulked portion 7*f*. Since each configuration of the second fixed terminal 7 is the same as each configuration of the first fixed terminal 6, the description thereof will be omitted.

The movable contact piece 8 extends in the left-right direction. The longitudinal direction of the movable contact piece 8 coincides with the left-right direction. The movable contact piece 8 is disposed above the first fixed terminal 6 and the second fixed terminal 7. The movable contact piece 8 includes a first movable contact 8*a* and a second movable contact 8*b*. The first movable contact 8*a* faces the first fixed contact 6*a* in the up-down direction and can make contact with the first fixed contact 6*a*. The second movable contact 8*b* faces the second fixed contact 7*a* in the up-down direction and can make contact with the second fixed contact 7*a*. In the present embodiment, the first movable contact 8*a* and the second movable contact 8*b* are fixed by being caulked to the movable contact piece 8, but the first movable contact 8*a* and the second movable contact 8*b* may be integrated with the movable contact piece 8.

The movable contact piece 8 is movable in a contact direction in which the first movable contact 8*a* approaches the first fixed contact 6*a* and an opening direction in which the first movable contact 8*a* separates from the first fixed contact 6*a*. In the present embodiment, the movable contact piece 8 is movable in the up-down direction. The movable contact piece 8 is connected to the movable member 9. The movable contact piece 8 is relatively movable with respect to the movable member 9 in the up-down direction.

The movable member 9 extends in the up-down direction. The movable member 9 is disposed at the center of the movable contact piece 8 in the left-right direction. The movable member 9 is made of an insulating material such as resin.

The upper end of the movable member 9 is connected to the drive device 4. The movable member 9 is movable in the up-down direction.

The contact spring 10 is a coil spring and urges the movable contact piece 8 in the contact direction (downward in the present embodiment). The contact spring 10 is housed inside the movable member 9.

The drive device 4 is disposed behind the contact device 3. The drive device 4 moves the movable contact piece 8 in the up-down direction via the movable member 9. The drive device 4 includes a coil 4*a*, a spool 4*b*, a fixed iron core 4*c*, a yoke 4*d*, a movable iron piece 4*e*, a hinge spring 4*f*, and a return spring 4*g*.

The coil 4*a* is wound around the outer circumference of the spool 4*b*. The spool 4*b* extends in the up-down direction. The fixed iron core 4*c* is disposed on the inner peripheral portion of the spool 4*b*. The yoke 4*d* is disposed so as to cover the rear of the coil 4*a*. The yoke 4*d* is substantially L-shaped when viewed from the left-right direction. The yoke 4*d* is connected to the lower end of the fixed iron core 4*c*.

The movable iron piece 4*e* is rotatably supported by the yoke 4*d* via the hinge spring 4*f*. The movable iron piece 4*e* rotates with the upper end of the yoke 4*d* as a fulcrum. The right end of the movable iron piece 4*e* is disposed above the movable member 9. The movable iron piece 4*e* is disposed above the fixed iron core 4*c*. The hinge spring 4*f* urges the movable iron piece 4*e* in a direction away from the fixed iron core 4*c*. The return spring 4*g* is disposed between the bottom portion 21 of the base 2 and the movable member 9. The return spring 4*g* urges the movable member 9 in the opening direction (upward in the present embodiment).

Next, the operation of the electromagnetic relay 1 will be described. In a state in which no voltage is applied to the coil 4*a*, the movable member 9 is pressed in the opening direction by the elastic force of the hinge spring 4*f* and the return spring 4*g*. Therefore, the first movable contact 8*a* is separated from the first fixed contact 6*a*, and the second movable contact 8*b* is separated from the second fixed contact 7*a*.

When a voltage is applied to the coil 4*a* whereby the drive device 4 is excited, the movable iron piece 4*e* is attracted to the fixed iron core 4*c* and rotates, and the movable member 9 is pressed in the contact direction by the movable iron piece 4*e*. As a result, the movable member 9 moves in the contact direction against the elastic forces of the hinge spring 4*f* and the return spring 4*g*. As the movable member 9 moves in the contact direction, the contact spring 10 moves in the contact direction. As a result, the movable contact piece 8 moves in the contact direction, such that the first movable contact 8*a* comes into contact with the first fixed contact 6*a*, and the second movable contact 8*b* comes into contact with the second fixed contact 7*a*. When the application of the voltage to the coil 4*a* is stopped, the movable member 9 moves in the opening direction by the elastic force of the hinge spring 4*f* and the return spring 4*g*.

Figure 4:
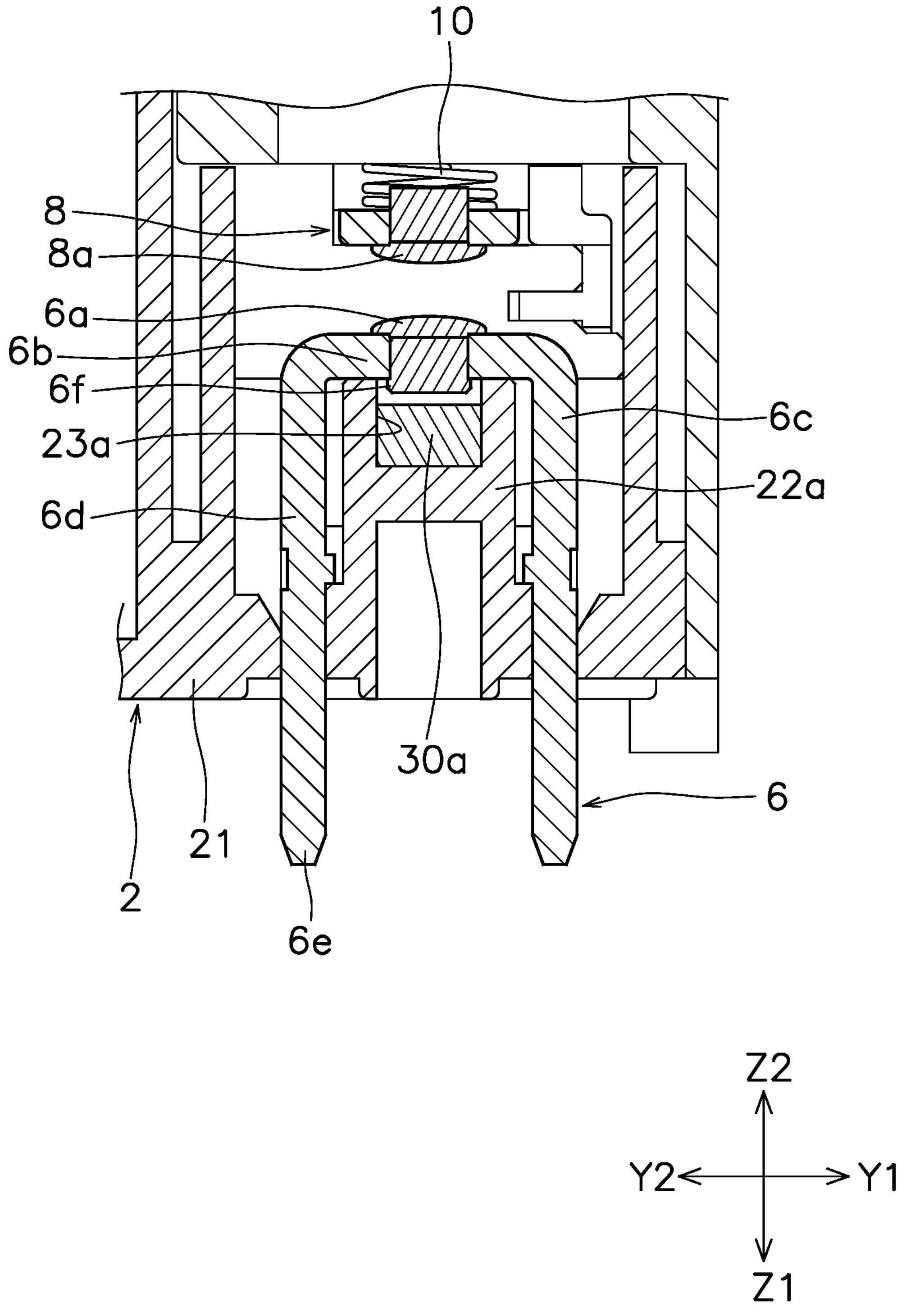
FIG. 4 is a cross-sectional view of the periphery of a first fixed contact cut along a plane orthogonal to the left-right direction.

FIG. 4 is a cross-sectional view of the periphery of the first fixed contact cut along a plane orthogonal to the left-right direction. As shown in FIGS. 3 and 4, the electromagnetic relay 1 further includes magnets 30*a* and 30*b*. The magnets 30*a* and 30*b* are permanent magnets. Magnets 30*a*, 30*b*, for example, ferrite magnets.

The magnet 30*a* is disposed in the magnet insertion hole 23*a*. The magnet 30*a* is prevented from coming off from the magnet insertion hole 23*a* by the first fixed terminal 6. Here, the magnet insertion hole 23*a* is provided in the vicinity of the first fixed contact 6*a* and opens toward the first fixed terminal 6. The magnet insertion hole 23*a* is disposed between the first extending portion 6*c* and the second extending portion 6*d*. In the present embodiment, the magnet insertion hole 23*a* is provided in the lower part of the contact support portion 6*b* and opens toward the contact support portion 6*b*. The first fixed terminal 6 covers the entire magnet insertion hole 23*a*. The magnet insertion hole 23*a* is sealed by the contact support portion 6*b* of the first fixed terminal 6. The magnet 30*a* may be lightly press-fitted into the magnet insertion hole 23*a*, for example. In that case, it is possible to prevent the position of the magnet 30*a* from fluctuating depending on the mounting direction of the electromagnetic relay 1 and affecting the breaking performance.

The magnet 30*a* is disposed below the first fixed contact 6*a* and overlaps with the first fixed contact 6*a* when viewed from the up-down direction. The magnet 30*a* is disposed apart from the first fixed terminal 6 and is not in contact with the first fixed terminal 6. The magnet 30*a* is disposed apart from the caulked portion 6*f* in the up-down direction.

The magnet 30*a* is disposed so that the magnetic flux of the magnet 30*a* flows in a direction intersecting the up-down direction between the contacts of the first fixed contact 6*a* and the first movable contact 8*a*. For example, the magnet 30*a* is disposed so that the north and the south pole face in the left-right direction. The magnet 30*a* may be disposed so that the north pole and the south pole face in the front-rear direction.

The magnet 30*b* has the same configuration as the magnet 30*a* except that the arrangement is different from that of the magnet 30*a*. The magnet 30*b* is disposed in the magnet insertion hole 23*b*. The magnet 30*b* is prevented from coming off from the magnet insertion hole 23*b* by the second fixed terminal 7. The magnet insertion hole 23*b* is provided in the vicinity of the second fixed contact 7*a* and opens toward the second fixed terminal 7. The magnet insertion hole 23*b* is disposed between the first extending portion 7*c* and the second extending portion 7*d*. In the present embodiment, the magnet insertion hole 23*b* is provided in the lower part of the contact support portion 7*b* and opens toward the contact support portion 7*b*. The second fixed terminal 7 covers the entire magnet insertion hole 23*b*. The magnet insertion hole 23*b* is sealed by the contact support portion 7*b* of the second fixed terminal 7.

In this electromagnetic relay 1, the magnet 30*a* is prevented from coming off from the magnet insertion hole 23*a* by the first fixed terminal 6. That is, since the first fixed terminal 6 is disposed so as to cover at least a part of the magnet insertion hole 23*a*, it is possible to suppress the magnet 30*a* from being affected by an arc generated between the first fixed contact 6*a* and the first movable contact 8*a* by the first fixed terminal 6. As a result, it is possible to suppress an increase in the manufacturing cost of the electromagnetic relay 1 as compared with the case where a member for protecting the magnet 30*a* from the arc or a member for holding the magnet 30*a* are separately provided. Further, since the magnet 30*a* can be disposed in the vicinity of the first fixed contact 6*a*, the magnetic flux density can be efficiently increased in the vicinity of the first fixed contact 6*a*. As a result, it becomes possible to select a ferrite magnet that is cheaper than the neodymium magnet in the magnet 30*a*, so that it is possible to further suppress an increase in the manufacturing cost of the electromagnetic relay 1. With respect to the magnet 30*b*, the magnetic flux density can be efficiently increased in the vicinity of the second fixed contact 7*a*, and the same effect as that of the magnet 30*a* can be obtained.

In the present embodiment, since the entire magnet insertion hole 23*a* is covered by the first fixed terminal 6, the magnet 30*a* can be further suppressed from being affected by the arc.

Further, since the magnet 30*a* is disposed below the first fixed contact 6*a*, a strong magnetic flux is generated below the first fixed contact 6*a*, and the arc is easily extended downward. Therefore, the first extending portion 6*c* and the second extending portion 6*d* can also serve as an arc horn for extending the arc. Further, by disposing the caulked portion 6*f* in the magnet insertion hole 23*a*, the magnet insertion hole 23*a* can be used as a space for releasing the caulked portion 6*f*.

While preferred embodiment of the electromagnetic relay according to one aspect of the present invention have been described above, it should be understood that the present invention is not limited to the above embodiment, and various changes can be made without departing from the gist of the invention. For example, the configuration of the contact device 3 or the drive device 4 may be changed.

Figure 5:
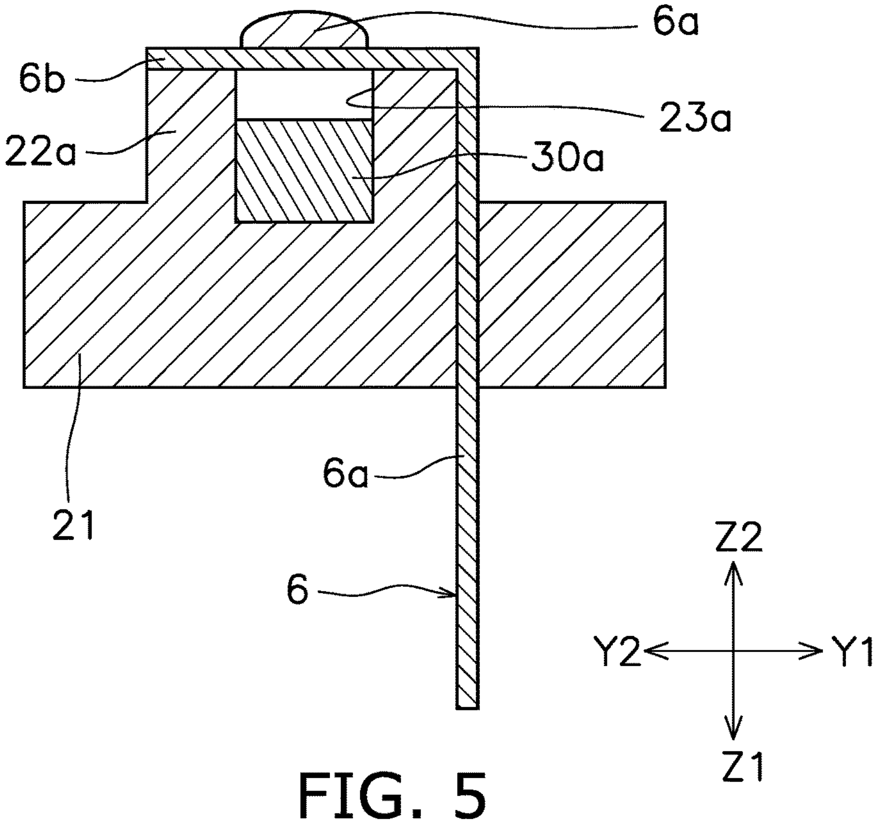
FIG. 5 is a cross-sectional view of a first fixed terminal according to a modification.

In the above embodiment, the first fixed terminal 6 has a U-shaped cross section, but as schematically shown in FIG. 5, the first fixed terminal 6 may have an L-shaped cross section. For example, either the first extending portion 6*c* or the second extending portion 6*d* may be omitted. FIG. 5 shows a configuration in which the second extending portion 6*d* is omitted in the first fixed terminal 6. Further, in the above embodiment, the first extending portion 6*c* and the second extending portion 6*d* protrude downward from the bottom portion 21 of the base 2, but only one of the first extending portion 6*c* or the second extending portion 6*d* may protrude downward from the bottom 21.

In the above embodiment, the magnet insertion hole 23*a* is open toward the contact support portion 6*b*, but the magnet insertion hole 23*a* may be open toward the first extending portion 6*c* or the second extending portion 6*d*. That is, the magnet 30*a* may be prevented from coming off from the magnet insertion hole 23*a* by the first extending portion 6*c* or the second extending portion 6*d*. Further, in a case of the configuration that does not stretch the arc toward the magnet insertion hole 23*a*, the first fixed terminal 6 does not need to cover the entire magnet insertion hole 23*a*.

Figure 6:
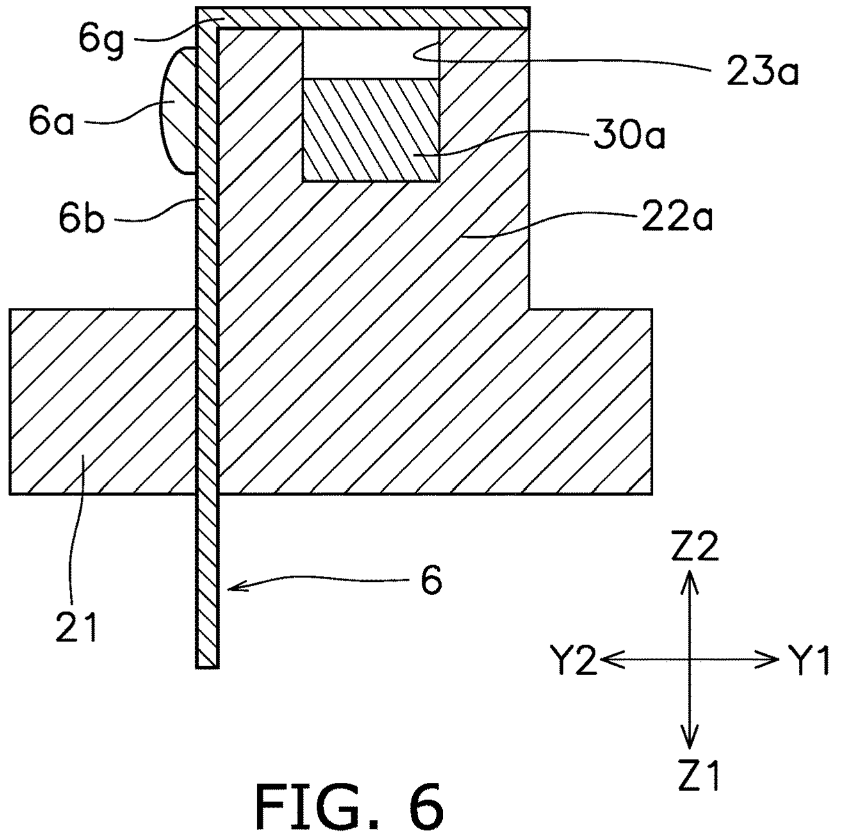
FIG. 6 is a cross-sectional view of a first fixed terminal according to a modification.
Figure 7:
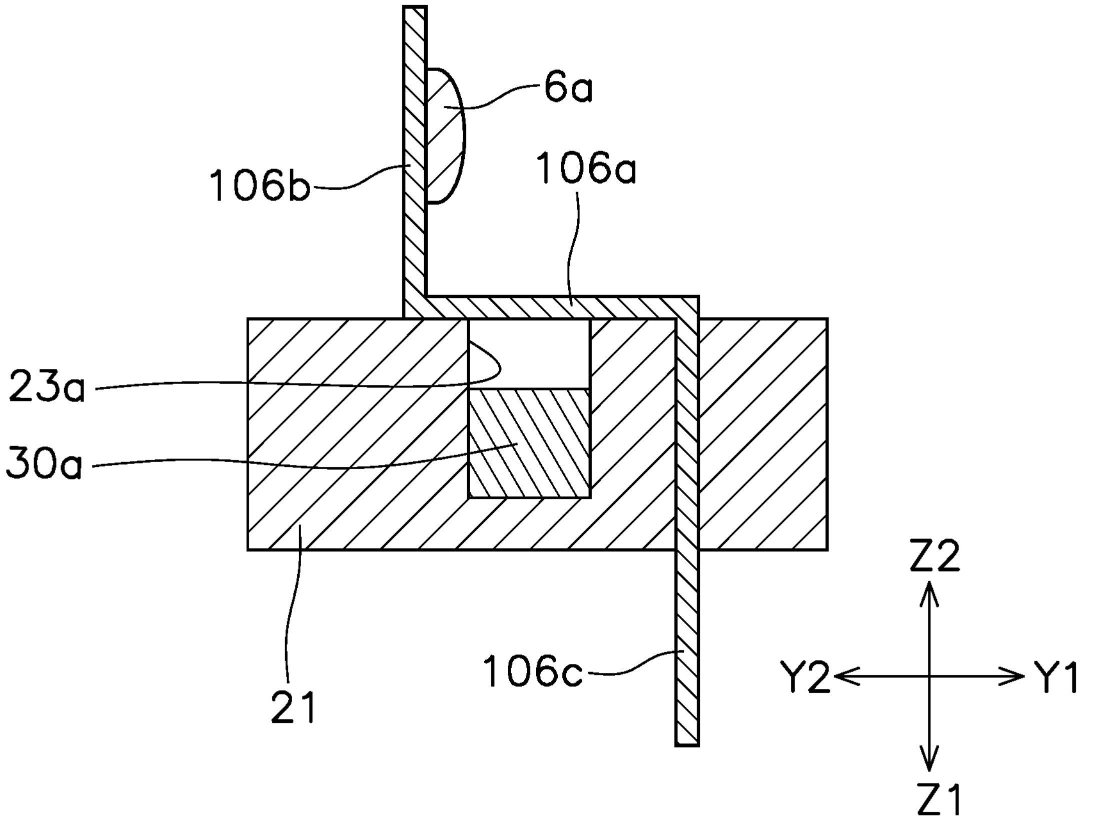
FIG. 7 is a cross-sectional view of a first fixed terminal according to a modification.
Figure 8:
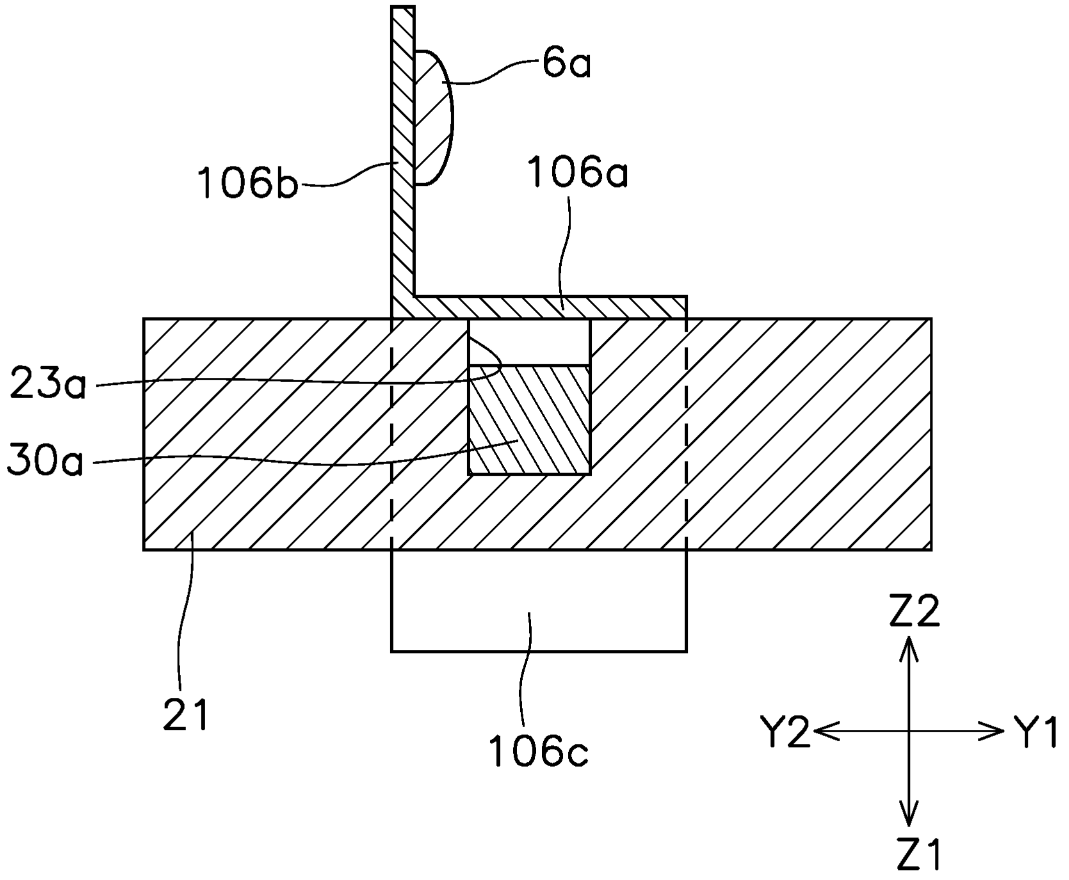
FIG. 8 is a cross-sectional view of a first fixed terminal according to a modification.

In the above embodiment, the first fixed contact 6*a* and the first movable contact 8*a* are disposed so as to face each other in the up-down direction. However, as schematically shown in FIGS. 6 to 8, the present invention may be applied to an electromagnetic relay in which the first fixed contact 6*a* and the first movable contact 8*a* face each other in the front-rear direction. In the example shown in FIG. 6, the contact support portion 6*b* extends in the up-down direction in the cross-sectional view, and the magnet 30*a* is prevented from coming off from the magnet insertion hole 23*a* by the extending portion 6*g* extending in the left-right direction in the cross-sectional view. The extending portion 6*g* may also serve as an arc horn.

The first fixed terminal 106 shown in FIG. 7 has a shape in which both ends of the plate-shaped terminal are bent in different directions. The first fixed terminal 106 includes retaining portion 106*a* for preventing the magnet 30*a* from coming off from the magnet insertion hole 23*a*, a contact support portion 106*b* extending upward from the rear end of the retaining portion 106*a*, and an extending portion 106*c* extending downward from the front end of the retaining portion 106*a*. As shown in FIG. 8, the extending portion 106*c* may extend downward from one end of the retaining portion 106*a* in the left-right direction.

REFERENCE NUMERALS

1 Electromagnetic relay
2 Base
6 First fixed terminal
6*a* First fixed contact
6*b* Contact support portion
6*c* First extending portion
6*d* Second extending portion
6*f* Caulked portion
7 Second fixed terminal
7*a* Second fixed contact
8 Movable contact piece
8*a* First fixed contact
8*b* Second fixed contact
23*a* Magnet insertion hole
31 Magnet

The invention claimed is:

1. An electromagnetic relay comprising:
a first fixed terminal including a first fixed contact;
a base configured to hold the first fixed terminal, the base including a magnet insertion hole disposed in a vicinity of the first fixed contact, the magnet insertion hole having an opening opened toward the first fixed terminal; and
a magnet disposed in the magnet insertion hole, the magnet prevented from coming off from the magnet insertion hole by the first fixed terminal;
wherein the first fixed terminal further includes a contact support portion and a first extending portion, the contact support portion being configured to support the first fixed contact, the first extending portion extending at an angle from the contact support portion and protruding outward from the base,
the first fixed terminal further includes a second extending portion connected to the contact support portion, the second extending portion facing the first extending portion, and
the magnet insertion hole is disposed between the first extending portion and the second extending portion.

2. The electromagnetic relay according to claim 1, wherein the first fixed terminal covers a whole of the opening of the magnet insertion hole.

3. The electromagnetic relay according to claim 1, wherein the magnet is disposed apart from the first fixed terminal.

4. The electromagnetic relay according to claim 1, wherein the magnet insertion hole is positioned toward the contact support portion.

5. The electromagnetic relay according to claim 1, wherein the first fixed contact includes a caulked portion fixed by being caulked to the first fixed terminal, and
the caulked portion is disposed in the magnet insertion hole.

6. The electromagnetic relay according to claim 1, further comprising:
a second fixed terminal including a second fixed contact, the second fixed terminal disposed apart from the first fixed terminal; and a movable contact piece including a first movable contact facing the first fixed contact and a second movable contact facing the second fixed contact.

7. An electromagnetic relay, comprising:

a non-conductive base including a non-conductive terminal support portion extending from the base toward the interior of the electromagnetic relay, the terminal support portion including a cup-shaped or pocket-shaped magnet insertion hole with a magnet disposed therein;

a fixed terminal that overlies and is supported by the terminal support portion, with the fixed terminal being positioned to block the magnet from coming out from the magnet insertion hole, the fixed terminal including a fixed contact; and a movable contact piece including a movable contact facing the fixed contact, wherein the cup-shaped or pocket-shaped magnet insertion hole has a concave shape in a first direction from the movable contact toward the fixed contact, a bottom surface extending in a direction intersecting the first direction, a inner surface extending from the bottom surface in a second direction opposite to the first direction, and a covered or blocked opening that is oriented toward the second direction.

8. The electromagnetic relay, according to claim 7, wherein the fixed terminal further includes an extending portion, the fixed terminal being supported by the terminal support portion outside of the cup-shaped or pocket-shaped magnet insertion hole with the extending portion extending along a side of the terminal support portion and through the base to the exterior of the relay.

9. The electromagnetic relay according to claim 7, wherein the terminal support portion is integral with the base.

10. The electromagnetic relay according to claim 7, wherein the fixed terminal is plate-shaped terminal.

* * * * *